US010974457B2

(12) United States Patent
Roesgen et al.

(10) Patent No.: US 10,974,457 B2
(45) Date of Patent: Apr. 13, 2021

(54) DEVICE AND METHOD FOR CALIBRATING AN IRRADIATION SYSTEM OF AN APPARATUS FOR PRODUCING A THREE-DIMENSIONAL WORK PIECE (71) Applicant: SLM Solutions Group AG, Luebeck (DE)

(72) Inventors: Lukas Roesgen, Luebeck (DE); Jan Wilkes, Luebeck (DE)

(73) Assignee: SLM SOLUTIONS GROUP AG, Luebeck (DE)

(*) Notice: Subject to any disclaimer, the term of this patent is extended or adjusted under 35 U.S.C. 154(b) by 357 days.

(21) Appl. No.: 16/180,692

(22) Filed: Nov. 5, 2018

(65) Prior Publication Data
US 2019/0070788 A1 Mar. 7, 2019

Related U.S. Application Data (63) Continuation of application No. PCT/EP2017/054024, filed on Feb. 22, 2017.

(30) Foreign Application Priority Data

May 4, 2016 (EP) .................................... 16168293

(51) Int. Cl.
G05B 19/401 (2006.01)
B29C 64/268 (2017.01)
(Continued)

(52) U.S. Cl.
CPC .......... B29C 64/393 (2017.08); B22F 3/1055 (2013.01); B28B 1/001 (2013.01);
(Continued)

(58) Field of Classification Search
CPC ... B29C 64/393; B29C 64/386; B29C 64/268; B29C 64/153; B29C 64/20;
(Continued)

(56) References Cited

U.S. PATENT DOCUMENTS 4,660,981 A 4/1987 Stridsberg
5,832,415 A 11/1998 Wilening et al.
(Continued)

FOREIGN PATENT DOCUMENTS

DE 4437284 A1 4/1996
DE 10150129 C1 4/2003
(Continued)

OTHER PUBLICATIONS

Chinese Office Action, Counter Chinese Appln. Serial No. 201780034113.5, 7 pgs., dated Apr. 29, 2020.
(Continued)

Primary Examiner — Michael J Brown
(74) Attorney, Agent, or Firm — Taft Stettinius & Hollister LLP (57) ABSTRACT A device for calibrating an irradiation system of an apparatus for producing a three-dimensional work piece includes a control unit to control the irradiation system so as to irradiate a radiation beam onto an irradiation plane according to a calibration pattern. The device also includes a sensor arrangement arranged in the irradiation plane to output signals to the control unit in response to being irradiated with the radiation beam according to the calibration pattern. The control unit generates a digital image of an actual irradiation pattern produced by the radiation beam incident on the sensor arrangement based on the signals output by the sensor arrangement, compares the digital image of the actual irradiation pattern with a digital image of a reference pattern so as to determine a deviation between the actual irradiation pattern and the reference pattern, and calibrates the irradiation system based on the determined deviation between the actual irradiation pattern and the reference pattern.

20 Claims, 2 Drawing Sheets (51) Int. Cl.
  *B29C 64/386* (2017.01)
  *B28B 17/00* (2006.01)
  *B29C 64/393* (2017.01)
  *B22F 3/105* (2006.01)
  *B33Y 30/00* (2015.01)
  *B33Y 40/00* (2020.01)
  *B33Y 10/00* (2015.01)
  *B33Y 50/02* (2015.01)
  *B29C 64/153* (2017.01)
  *B28B 1/00* (2006.01)

(52) U.S. Cl.
  CPC ........ *B28B 17/0081* (2013.01); *B29C 64/153* (2017.08); *B29C 64/268* (2017.08); *B29C 64/386* (2017.08); *B33Y 10/00* (2014.12); *B33Y 30/00* (2014.12); *B33Y 40/00* (2014.12); *B33Y 50/02* (2014.12); *G05B 19/401* (2013.01); *B22F 2003/1057* (2013.01); *G05B 2219/37067* (2013.01); *G05B 2219/37068* (2013.01); *G05B 2219/37555* (2013.01); *G05B 2219/37572* (2013.01); *G05B 2219/49007* (2013.01); *Y02P 10/25* (2015.11)

(58) Field of Classification Search
  CPC ........ G05B 19/401; G05B 2219/49007; G05B 2219/37067; G05B 2219/37572; G05B 2219/37555; G05B 2219/37068; B33Y 40/00; B33Y 10/00; B33Y 50/02; B33Y 30/00; B28B 1/001; B28B 17/0081; B22F 3/1055
  USPC ......................................................... 700/117
  See application file for complete search history.

(56) References Cited

U.S. PATENT DOCUMENTS

| | | | |
|---|---|---|---|
| 6,483,596 B1 | 11/2002 | Philippi et al. | |
| 8,803,073 B2* | 8/2014 | Philippi | B23K 26/34 250/252.1 |
| 9,221,100 B2 | 12/2015 | Schwarze et al. | |
| 2015/0183158 A1* | 7/2015 | Schwarze | B22F 3/1055 264/497 |
| 2016/0023403 A1 | 1/2016 | Ramos et al. | |
| 2016/0144431 A1* | 5/2016 | Wiesner | B22F 3/1055 419/53 |
| 2016/0144571 A1 | 5/2016 | Philippi | |
| 2018/0361728 A1 | 12/2018 | Philippi | |

FOREIGN PATENT DOCUMENTS

| | | |
|---|---|---|
| DE | 102009016585 A1 | 10/2010 |
| DE | 102013213547 A1 | 1/2015 |
| EP | 0792481 B1 | 6/1998 |
| EP | 1048441 B1 | 2/2002 |
| EP | 1793979 B1 | 2/2009 |
| EP | 2280816 B1 | 10/2013 |
| EP | 2335848 B1 | 8/2014 |
| EP | 2862651 A1 | 4/2015 |
| EP | 2875897 B1 | 1/2016 |
| JP | H0511854 A | 1/1993 |
| JP | 2002210835 A | 7/2002 |
| JP | 2010536624 A | 12/2010 |
| JP | 2012522661 A | 9/2012 |
| WO | 94/15265 A1 | 7/1994 |
| WO | 2015003937 A1 | 1/2015 |
| WO | 2017108762 A1 | 6/2017 |

OTHER PUBLICATIONS

English translation of Notice of Office Action from Chinese Appln. No. 201780034113.5, 2 pgs., dated Apr. 29, 2020.
Japan Patent Office, Summary of Notice of Reasons for Rejection in corresponding application No. 2018-557870, dated Aug. 27, 2019, 2 pp.
European Patent Office Extended European Search Report dated Nov. 18, 2016 cited in priority EP Patent Application No. 16168293.5 (7 pages).
European Patent Office European Communication pursuant to Article 94(3) EPC dated Jul. 20, 2018 cited in priority EP Patent Application No. 16168293.5 (7 pages).
Patent Cooperation Treaty (PCT) International Search Report and Written Opinion of the International Searching Authority dated Mar. 23, 2017 cited in priority PCT Patent Application No. PCT/EP2017/054024 (10 pages).
Patent Cooperation Treaty (PCT) International Preliminary Report on Patentability dated Jul. 17, 2018 cited in priority PCT Patent Application No. PCT/EP2017/054024 (7 pages).

* cited by examiner

DEVICE AND METHOD FOR CALIBRATING AN IRRADIATION SYSTEM OF AN APPARATUS FOR PRODUCING A THREE-DIMENSIONAL WORK PIECE

The present invention relates to a device and a method for calibrating an irradiation system of an apparatus for producing a three-dimensional work piece by irradiating layers of a raw material powder with electromagnetic or particle radiation.

Powder bed fusion is an additive layering process by which pulverulent, in particular metallic and/or ceramic raw materials can be processed to three dimensional work pieces of complex shapes. To that end, a raw material powder layer is applied onto a carrier and subjected to laser radiation in a site selective manner in dependence on the desired geometry of the work piece that is to be produced. The laser radiation penetrating into the powder layer causes heating and consequently melting or sintering of the raw material powder particles. Further raw material powder layers are then applied successively to the layer on the carrier that has already been subjected to laser treatment, until the work piece has the desired shape and size. Selective laser melting or laser sintering can be used in particular for the production of prototypes, tools, replacement parts or medical prostheses, such as, for example, dental or orthopaedic prostheses, on the basis of CAD data.

An apparatus for producing moulded bodies from pulverulent raw materials by a powder bed fusion process is described, for example, in EP 1 793 979 B1. The prior art apparatus comprises a process chamber which accommodates a plurality of carriers for the shaped bodies to be manufactured. A powder layer preparation system comprises a powder reservoir holder that can be moved to and fro across the carriers in order to apply a raw material powder to be irradiated with a laser beam onto the carriers. The process chamber is connected to a protective gas circuit comprising a supply line via which a protective gas may be supplied to the process chamber in order to establish a protective gas atmosphere within the process chamber.

An irradiation system which may, for example, be employed in an apparatus for producing three-dimensional work pieces by irradiating pulverulent raw materials is described in EP 2 335 848 B1. The irradiation system comprises a radiation source, in particular a laser source, and an optical unit. The optical unit which is supplied with a radiation beam emitted by the radiation source comprises a beam expander and a scanner unit. Within the scanner unit, diffractive optical elements which may be folded into the beam path in order to split the radiation beam into a plurality of radiation sub-beams are arranged in front of a deflection mirror for deflecting the radiation sub-beams. The radiation beam or the radiation sub-beams emitted by the scanner unit are supplied to an objective lens which is designed in the form of an f-theta lens.

For calibrating the irradiation system and in particular the optical unit employed in an apparatus for producing three-dimensional work pieces by irradiating pulverulent raw materials, a so-called burn-off foil is applied to the carrier which, during normal operation of the apparatus, carries the raw material powder layers to be irradiated. The burn-off foil then is irradiated according to a predetermined pattern resulting in the development of a burn-off image of the irradiation pattern on the foil. The burn-off image is digitalized and compared to a digital reference image of the irradiation pattern. Based on the result of the comparison between the digitalized burn-off image and the reference image, the irradiation unit is calibrated in order to compensate for deviations between the actual burn-off image and the reference image.

A burn-off foil is also used for calibrating tracks of a plurality of radiation beams, in particular laser beams, operating in overlapping zones between adjacent irradiation areas defined on the carrier of an apparatus for producing three-dimensional work pieces by irradiating pulverulent raw materials which is equipped with a plurality of irradiation units as described, for example, in EP 2 875 897 B1 or EP 2 862 651 A1.

Basically, the thickness of the burned lines produced on the burn-off foil upon irradiating the foil could also be used as an indication for measuring a defocusing of the radiation beam. However, the accuracy and reliability of these measurements are typically too low for allowing the measurements to be used for calibrating the focusing of the radiation beam. Thus, for calibrating the focusing of the radiation beam, usually additional caustic measurements are performed.

The invention is directed at the object of providing a device and a method which allow a reliable and accurate calibration of an irradiation system employed in an apparatus for producing a three-dimensional work piece by irradiating layers of a raw material powder with electromagnetic or particle radiation.

This object is addressed by a device and a method as defined in the claims.

A device for calibrating an irradiation system of an apparatus for producing a three-dimensional work piece comprises a control unit which is adapted to control the irradiation system so as to irradiate a radiation beam onto an irradiation plane according to a calibration pattern. The irradiation system to be calibrated may comprise a radiation source and a plurality of optical elements. The irradiation system may be provided with only one radiation source. It is, however, also conceivable that the irradiation system is equipped with a plurality of radiation sources. In case the irradiation system comprises a plurality of radiation sources, a separate optical unit comprising a plurality of optical elements may be associated with each radiation source.

The at least one radiation source may be a laser source, for example a diode pumped Ytterbium fibre laser. Further, the plurality of optical elements may, for example, include a beam expander for expanding a radiation beam emitted by the radiation source, a scanner and an object lens. Alternatively, the plurality of optical is elements may comprise a beam expander including a focusing optic and a scanner unit. By means of the scanner unit, the position of a focus of the radiation beam both in the direction of the beam path and in a plane perpendicular to the beam path can be changed and adapted. The scanner unit may be designed in the form of a galvanometer scanner and the object lens may be an f-theta object lens.

The irradiation plane may be a plane which, during normal operation of the apparatus, corresponds to a surface of a raw material powder layer which is applied onto a carrier and which is subjected to the radiation beam emitted by the irradiation system in order to generate the three-dimensional work piece by a generative layer construction method. It is, however, also conceivable that the irradiation plane which is irradiated by the radiation beam during calibration of the irradiation system is offset, in particular vertically offset, relative to the surface of the raw material powder layer which, during normal operation of the apparatus, is irradiated by the radiation beam.

The irradiation plane preferably is arranged within a process chamber which may be sealable against the ambient atmosphere, in order to be able to maintain a controlled atmosphere, in particular an inert atmosphere, within the process chamber. The raw material powder which, during normal operation of the apparatus, is irradiated by the radiation beam emitted by the irradiation system may be a metallic powder, but may also be a ceramic powder or a plastic material powder or a powder containing different materials. The powder may have any suitable particle size or particle size distribution. It is, however, preferable to process powders of particle sizes <100 µm.

The control unit may be an electronic control unit which exclusively serves to control the calibration of the irradiation system. It is, however, also conceivable that the control unit, which may be implemented in hardware or software, is integrated into a subordinate control unit of the apparatus for producing a three-dimensional work piece which, for example, also serves to control the normal operation of the apparatus and/or the irradiation system. The calibration pattern may be any pattern which is suitable to detect a decalibration of the irradiation system and may, for example, comprise point- and/or line-shaped elements which may be evenly or unevenly distributed across the irradiation plane.

The device for calibrating an irradiation system further comprises a sensor arrangement. The sensor arrangement is adapted to be arranged in the irradiation plane and to output signals to the control unit in response to being irradiated with the irradiation beam according to the calibration pattern. The sensor arrangement thus is sensitive to being irradiated with the radiation beam emitted by the irradiation system and outputs electronic signals which are characteristic of the pattern according to which the radiation beam emitted by the irradiation system is incident on the sensor arrangement. As a result, the pattern according to which the radiation beam emitted by the irradiation system is incident on the sensor arrangement, by means of the sensor arrangement, is electronically tracked and "recorded". The device for calibrating an irradiation system thus eliminates the need to use a disposable burn-off foil for tracking and "recording" a calibration pattern, the radiation beam follows upon being irradiated onto the irradiation plane during calibration of the irradiation system. For example, the sensor arrangement may comprise a photo sensor, a photo chip, a photo diode, a CCD sensor and/or a CMOS sensor.

The control unit of the device for calibrating an irradiation system further is adapted to generate a digital image of an actual irradiation pattern produced by the radiation beam incident on the sensor arrangement based on the signals output by the sensor arrangement, to compare the digital image of the actual radiation pattern with a digital image of a reference pattern so as to determine a deviation between the actual irradiation pattern and the reference pattern, and to calibrate the irradiation system based on the determined deviation between the actual irradiation pattern and the reference pattern. In other words, based on the signals provided to the control unit from the sensor arrangement, the control unit directly generates a digital image of the "real" irradiation pattern, compares said digital image of the "real" irradiation pattern with a digital image of a reference pattern and calibrates the irradiation system on the basis of a deviation between the "real" irradiation pattern and the reference pattern.

As a result, the step of digitalizing the burn-off image of the irradiation pattern which is generated on the burn-off foil in conventional calibration methods can be dispensed with. It is therefore no longer necessary to move the burn-off foil from the installation site of the apparatus equipped with the irradiation system to be calibrated to a site where the evaluation of the burn-off foil is performed, for example a manufacturing site of the manufacturer of the apparatus. Hence, cost and time savings can be realized. Furthermore, errors occurring upon digitalizing the burn-off image of the irradiation pattern on the burn-off foil can be avoided. Consequently, the deviation between the actual irradiation pattern and the reference pattern can be determined particularly precisely and the calibration of the irradiation system can be performed with a high accuracy and a high reliability.

The calibration process performed by means of the device described herein in particular concerns the scanner of the optical unit of the irradiation system, i.e. the device may be used for calibrating the scanner of the irradiation system's optical unit. However, due to the high accuracy of the digital image of the actual irradiation pattern which may be obtained with the aid of the sensor arrangement, the device may also be used to calibrate the scanner of the irradiation system's optical unit in order to focus the radiation beam as desired as will be described in more detail below. Thus, additional caustic measurements which are usually necessary for focusing the radiation beam may be avoided. In addition, the device may be used for measuring an elliptic distortion of the radiation beam incident on the irradiation plane which, for example, may become relevant during a work piece production process upon irradiating corner locations within the irradiation plane which are spaced from a center of the irradiation plane. A suitable beam compensation may be initiated based on the measurement.

A device for calibrating an irradiation system which should be used for calibrating the scanner of the optical unit of the irradiation system only may be equipped with a cost efficient sensor arrangement configured for digitally detecting per pixel whether a pixel location is irradiated or not. If, however, the device for calibrating an irradiation system should be used for focusing the radiation beam or for a beam compensation, the sensor arrangement has to be suitable to also measure an intensity of the radiation beam at a specific pixel location. The device thus can be equipped with an appropriately designed sensor arrangement as needed.

In a preferred embodiment of the device for calibrating an irradiation system, the control unit is adapted to calibrate the irradiation system based on the determined deviation between the actual irradiation pattern and the reference pattern in such a manner that the deviation between the actual irradiation pattern and the reference pattern is eliminated. This allows a particularly easy and reliable calibration of the irradiation system.

The sensor arrangement may be integrated into a calibration carrier which, during normal operation of the apparatus, i.e. during operation of the apparatus for generating the three-dimensional work piece, carries a raw material powder to be irradiated. In this embodiment of the device, the same carrier is used for both the calibration process for calibrating the irradiation system of the apparatus and the normal operation of the apparatus. As a result, the calibration process can be performed particularly time efficient without modifying the set-up of the apparatus.

Alternatively, it is, however, also conceivable that the sensor arrangement is integrated into a calibration carrier which is adapted to replace, during calibrating the irradiation system, a carrier which, during normal operation of the apparatus, carries the raw material powder to be irradiated. With this embodiment of the device for calibrating an irradiation system, the calibration process still can be performed quite time efficient, since the carrier, which, during normal operation of the apparatus, carries the raw material powder to be irradiated can simply and easily be replaced by the calibration carrier. Furthermore, damages or deterioration of the sensor arrangement which may occur when the sensor arrangement is exposed to the radiation beam also during normal operation of the apparatus, can be avoided.

The sensor arrangement may comprise a plurality of sensors which are arranged at discrete positions within the irradiation plane. For example, individual sensors may be arranged in the irradiation plane in the area of point- and/or line-shaped elements of the calibration pattern. The use of individual relatively small sized sensors may reduce the costs for the device for calibrating an irradiation system. A detection area of each of the sensors, however, preferably is selected such that the sensors are irradiated with the radiation beam emitted by the irradiation system according to the calibration pattern even if the irradiation system is decalibrated. In other words, the detection area of each of the sensors should be large enough to ensure that the sensors, during calibration of the irradiation system, are exposed to the radiation beam emitted by the irradiation system, even if the actual irradiation pattern according to which the radiation beam, during calibration of the irradiation system, moves across the irradiation plane is offset as compared to the reference pattern.

In an alternative embodiment, the sensor arrangement may be equipped with a single sensor having a detection area which is selected so as to substantially cover the irradiation plane. The device then operates particularly reliable, even in case the irradiation system is heavily decalibrated.

The digital image of the reference pattern may be stored in a memory of the control unit. Alternatively, it is, however, also conceivable to store the digital image of the reference pattern in a memory which is associated with another unit than the control unit or on a movable storage medium.

Furthermore, the control unit may be adapted to display the digital image of the reference pattern and/or the digital image of the actual irradiation pattern on a display device. Hence, the results of the calibration procedure may be visualized.

The control unit may be adapted to control the irradiation system in such a manner that a power of the radiation beam, during calibrating the irradiation system, is lower than during normal operation of the apparatus. For example, during calibrating the irradiation system, the control unit may control the irradiation system in such a manner that the power of the radiation beam is reduced to 1% as compared to the power of the radiation beam during normal operation of the apparatus. By using a radiation beam with a reduced power for calibrating the irradiation system, it may be ensured that the sensor arrangement is not damaged by the radiation beam.

For reducing the power of the radiation beam, the control unit may control the irradiation system in such a manner that beam traps or beam dividers, wherein the radiation beam is weakened for example by being directed through a gray filter, are introduced into the beam path. Alternatively, it is also conceivable, at least for calibrating one or more scanner(s) of the irradiation system, to use a calibration radiation source having less power than the beam source used during during normal operation of the apparatus. However, the measures for reducing the power of the radiation beam should be selected in such a manner that the reduction of the power of the radiation beam does not influence the focus position of the radiation beam.

In a preferred embodiment of the device for calibrating an irradiation system, the control unit is adapted to determine a width of a line of the actual irradiation pattern produced by the radiation beam incident on the sensor arrangement, to compare the determined line width with a reference line width, and to calibrate the irradiation system so as to focus the radiation beam based on the comparison between the determined line width with the reference line. As already indicated above, due to the high accuracy and resolution of the digital image of the actual irradiation pattern which is obtained with the aid of the sensor arrangement, a deviation between the determined line width and the reference line width may be determined by the control unit with the required accuracy so as to serve as a basis for focusing the radiation beam. The irradiation system then may be calibrated based on the determined deviation between the determined line width and the reference line width in such a manner that the deviation between the determined line width and the reference line width is eliminated. As a result, a focusing of the radiation beam may be achieved without the need to carry out additional caustic measurements.

Further, the control unit may be adapted to determine a shape of a spot of the radiation beam incident on the sensor arrangement. Thereby, e.g. an elliptic distortion of the radiation beam may be determined. The control unit may further by adapted to compare the determined shape with a reference shape, and calibrate the irradiation system so as compensate for an elliptic distortion of the radiation beam based on the comparison between the determined shape and the reference shape.

The irradiation system to be calibrated may comprise a plurality of irradiation units. Each irradiation unit may be adapted to irradiate a radiation beam onto an associated irradiation area of the irradiation plane and onto an overlap area arranged between adjacent irradiation areas. Each irradiation unit of the irradiation system may comprise its separate associated radiation source. It is, however, also conceivable that the plurality of irradiation units are supplied with the radiation beam from a common radiation source. An overlap area of the irradiation plane may be exposed to radiation beams emitted by only two irradiation units which are adapted to irradiate a radiation beam onto irradiation areas arranged adjacent to the overlap area. It is, however, also conceivable, for example for an overlap area arranged in the region of an intersection of four quadrant-shaped irradiation areas, to be exposed to radiation beams emitted by more than two, for example four, irradiation units. Furthermore, only one overlap area or a plurality of overlap areas may be defined in the irradiation plane, for example in dependence on the number and the arrangement of irradiation areas in the irradiation plane.

A device for calibrating such an irradiation system comprising multiple irradiation units preferably is equipped with a control unit which is adapted to control the plurality of irradiation units so as to irradiate a selected overlap area with a plurality of radiation beams according to respective calibration patterns. The control unit may further be adapted to generate a digital image of the actual irradiation patterns produced by the radiation beams incident on the sensor arrangement based on the signals output by the sensor arrangement. Additionally, the control unit may be adapted to compare the digital image of the actual irradiation patterns with a digital image of respective reference patterns so as to determine a deviation between the actual irradiation patterns and the respective reference patterns. Finally, the control unit may be adapted to calibrate the irradiation units based on the determined deviation between the actual irradiation patterns and the reference patterns.

Thus, the device for calibrating an irradiation system may be used to record the tracks of the plurality of radiation beams incident on the overlap area and to calibrate these tracks as desired. Consequently, the scanners of the plurality of irradiation units may be calibrated and adjusted relative to each other.

In a method for calibrating an irradiation system of an apparatus for producing a three-dimensional work piece the irradiation system is controlled so as to irradiate a radiation pattern onto an irradiation plane according to a calibration pattern. A sensor arrangement is arranged in the irradiation plane which outputs signals in response to being irradiated with the radiation beam according to the calibration pattern. A digital image of an actual irradiation pattern produced by the radiation beam incident on the sensor arrangement is generated based on the signals output by the sensor arrangement. The digital image of the actual irradiation pattern is compared with a digital image of a reference pattern so as to determine a deviation between the actual irradiation pattern and the reference pattern. The irradiation system is calibrated based on the determined deviation between the actual irradiation pattern and the reference pattern.

In a preferred embodiment of the method, the irradiation system is calibrated based on the determined deviation between the actual irradiation pattern and the reference pattern in such a manner that the deviation between the actual irradiation pattern and the reference pattern is eliminated.

The sensor arrangement may be integrated into a calibration carrier which, during normal operation of the apparatus, carries a raw material powder to be irradiated.

Alternatively, the sensor arrangement may be integrated into a calibration carrier which is adapted to replace, during calibrating the irradiation system, a carrier which, during normal operation of the apparatus, carries the raw material powder to be irradiated.

In a preferred embodiment of the method for calibrating an irradiation system, the sensor arrangement may comprise a plurality of sensors and the plurality of sensors may be arranged at discrete positions within the irradiation plane. A detection area of each of the sensors preferably is selected such that the sensors are irradiated with the radiation beam emitted by the irradiation system according to the calibration pattern even if the irradiation system is decalibrated.

Alternatively, the sensor arrangement may comprise a single sensor that may be arranged in the irradiation plane. A detection area of the single sensor preferably is selected so as to substantially cover the irradiation plane.

The digital image of the reference pattern may be stored in a memory of the control unit, a memory associated with another unit than the control unit or on a movable storage medium.

The digital image of the reference pattern and/or the digital image of the actual irradiation pattern may be displayed on a display device.

The irradiation system may be controlled in such a manner that a power of the radiation beam, during calibrating the irradiation system, is lower than during normal operation of the apparatus.

In the method for calibrating an irradiation system, a width of a line of the actual irradiation pattern produced by the radiation beam incident on the sensor arrangement may be determined. The determined line width may be compared with a reference line width. The irradiation system may be calibrated so as to focus the radiation beam based on the comparison between the determined line width and the reference line width, i.e. based on a deviation between the determined line width and the reference line width.

Furthermore, in the method for calibrating an irradiation system, a shape of a spot of the radiation beam incident on the sensor arrangement may be determined. The determined shape may be compared with a reference shape, and the irradiation system may be calibrated so as compensate for an elliptic distortion of the radiation beam based on the comparison between the determined shape and the reference shape.

For calibrating an irradiation system of the apparatus for producing a three-dimensional work piece which comprises a plurality of irradiation units, wherein each irradiation unit is adapted to irradiate a radiation beam onto an associated irradiation area of the irradiation plane and onto an overlap area arranged between adjacent irradiation areas, the method may comprise the step of controlling the plurality of irradiation units so as to irradiate a selected overlap area with a plurality of radiation beams emitted by the plurality of irradiation units according to respective calibration patterns. A digital image of actual irradiation patterns produced by the radiation beams incident on the sensor arrangement may be generated based on the signals output by the sensor arrangement. The digital image of the actual irradiation patterns may be compared with a digital image of respective reference patterns so as to determine a deviation between the actual irradiation patterns and the respective reference patterns. The irradiation units may be calibrated based on the determined deviation between the actual irradiation patterns and the reference patterns.

Preferred embodiments of the invention now are described in greater detail with reference to the appended schematic drawings wherein.

Figure 1:
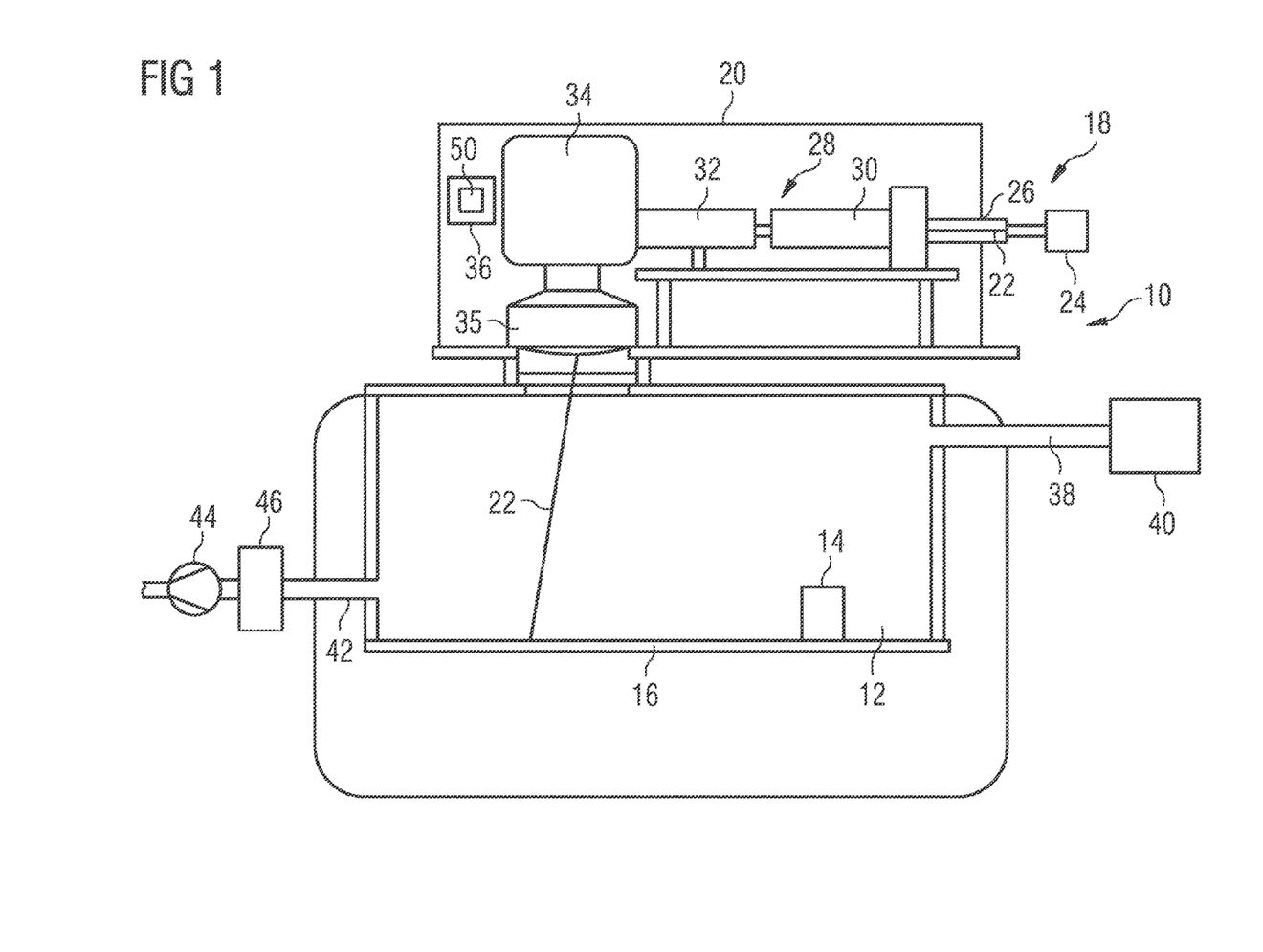
FIG. 1 shows an apparatus for producing a three-dimensional work pieces by selectively irradiating electromagnetic or particle radiation onto a raw material powder and FIG. 2 shows a first embodiment of a device for calibrating an irradiation system of the apparatus according to FIG. 1.

FIG. 1 shows an apparatus 10 for producing a three-dimensional work piece. The apparatus 10 comprises a process chamber 12. A powder application device 14, which is disposed in the process chamber 12, serves to apply a raw material powder onto a carrier 16. The carrier 16 is designed to be displaceable in vertical direction so that, with increasing construction height of a work piece, as it is built up in layers from the raw material powder on the carrier 16, the carrier 16 can be moved dove wards in the vertical direction.

The apparatus 10 further comprises an irradiation system 18 for selectively irradiating a radiation, in particular laser radiation, onto the raw material powder applied onto the carrier 16. By means of the irradiation system 20, the raw material powder applied onto the carrier 16 may be subjected to radiation in a site-selective manner in dependence on the desired geometry of the work piece that is to be produced. The irradiation system 18 has a hermetically sealable housing 20. A radiation beam 22, in particular a laser beam, provided by a radiation source 24, in particular a laser source which may, for example, comprise a diode pumped Ytterbium fibre laser emitting laser light at a wavelength of approximately 1070 to 1080 nm is directed into the housing 20 via an opening 26.

The irradiation system 18 further comprises an optical unit 28 for guiding and processing the radiation beam 22, the optical unit 28 comprising optical elements such as a beam expander 30 for expanding the radiation beam 22 emitted by the radiation source 24, a focusing lens 32 for focusing the radiation beam 22, a scanner 34 and an object lens 35. The scanner 34 and the object lens 35 may, for example, be designed in the form of a galvanometer scanner and an f-theta object lens. By means of the scanner 34, the position of the focus of the radiation beam 22 both in the direction of the beam path and in a plane perpendicular to the beam path can be changed and adapted. The operation of the irradiation system 18 is controlled by means of a control arrangement 36.

The process chamber 12 is sealable against the ambient atmosphere, i.e. against the environment surrounding the process chamber 12. The process chamber 12 is connected to a gas supply line 38 via which a gas provided by a gas source 40 may be supplied to the process chamber 12. The gas supplied to the process chamber 12 from the gas source 40 may be an inert gas such as, for example, Argon or Nitrogen. A discharge line 42 serves to discharge gas containing particulate impurities such as, for example, raw material powder particles or welding smoke particles from the process chamber 12 during irradiating electromagnetic or particle radiation onto the raw material powder applied onto the carrier 16 in order to produce a work piece made of said raw material powder by an additive layer construction method. The gas containing particulate impurities is discharged from the process chamber 12 by means of a conveying device 44 such as, for example, a pump. A filter 46 disposed in the discharge line 42 upstream of the conveying device 44 serves to filter the particulate impurities from the gas stream discharged from the process chamber 12 After passing the filter 46 the gas stream may be recirculated into the process chamber 12 via the gas supply line 38.

Figure 2:
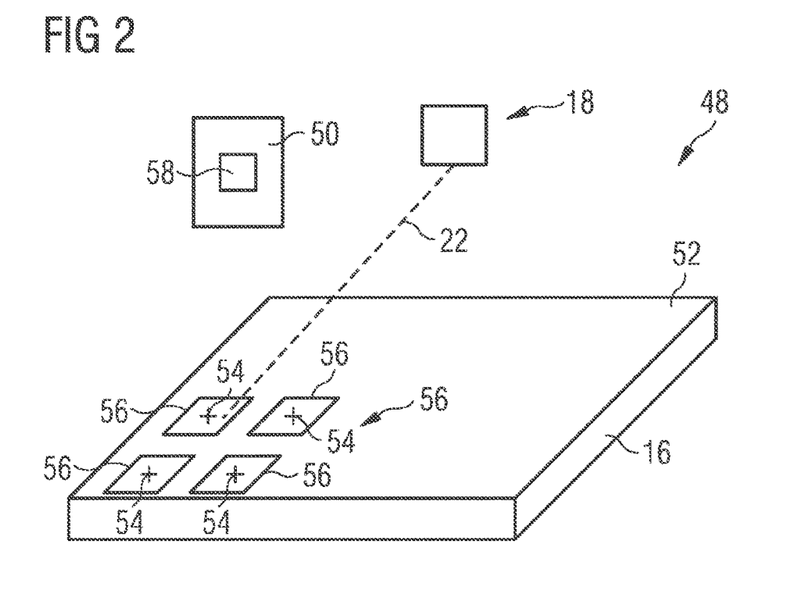
Figure 3:
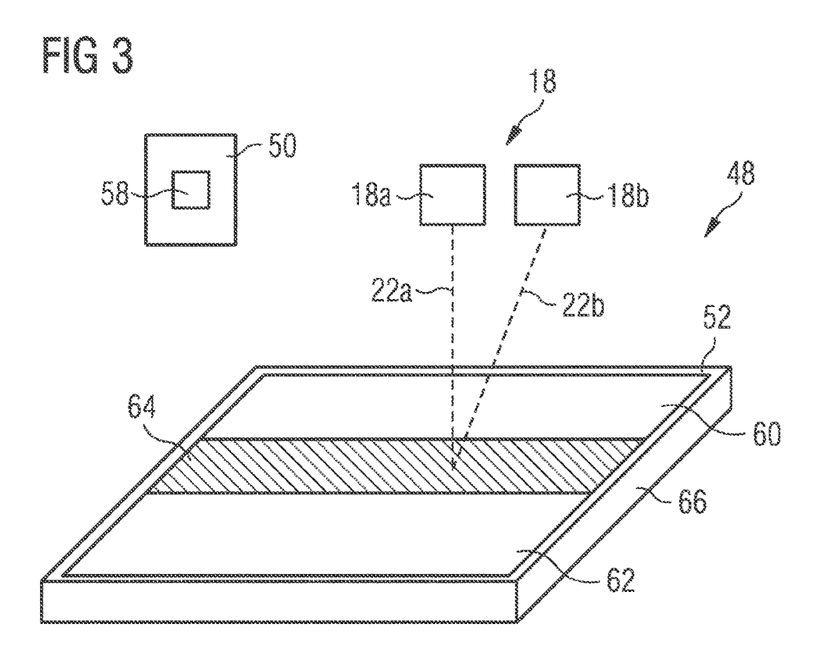
FIG. 3 shows a second embodiment of a device for calibrating an irradiation system of the apparatus according to FIG. 1.

Two different embodiments of a device 48 for calibrating the irradiation system 18 of the apparatus 10 are depicted in greater detail in FIGS. 2 and 3. In the arrangement of FIG. 2, the device 48 is used for calibrating the irradiation system 18 of an apparatus 10 for producing a three-dimensional work piece which is equipped with a single irradiation unit 18a. The device 48 comprises a control unit 50 which is embedded in the control arrangement 36 for controlling the operation of the irradiation system 18. For calibrating the irradiation system 18, the control unit 50 controls the irradiation system 18 so as to irradiate the radiation beam 22 onto an irradiation plane 52 according to a calibration pattern.

The irradiation plane 52 identified in FIGS. 2 and 3 is identical to a plane which, during normal operation of the apparatus 10, corresponds to a surface of a raw material powder layer which is applied onto the carrier 16 and which is subjected to the radiation beam 22 emitted by the irradiation system 18 in order to generate the three-dimensional work piece by a generative layer construction method. The calibration pattern may be any pattern which is suitable to detect a decalibration of the irradiation system 18 and, in the arrangement of FIG. 2, comprises a plurality of point-shaped elements which are evenly distributed across the irradiation plane 52. In FIG. 2, the point-shaped elements of the calibration pattern are schematically illustrated and designated with the reference numeral 54. The skilled person will, however, appreciate that it is not necessary for the point-shaped elements 54 to be physically provided on the carrier 16. Instead, the point-shaped elements 54 may also simply be provided as a part of the digital calibration pattern stored in a memory 58 of the control unit 50.

The device 48 further comprises a sensor arrangement 56 which, for calibrating the irradiation system 18, is arranged in the irradiation plane 52. During calibration of the irradiation system 18 under the control of the control unit 50, the sensor arrangement 56 is irradiated with the radiation beam emitted by the irradiation system 18 so according to the calibration pattern. The sensor arrangement 56 is sensitive to being irradiated with the radiation beam 22 emitted by the irradiation system 18 and outputs electronic signals which are characteristic of the pattern according to which the radiation beam 22 emitted by the irradiation system is incident on the sensor arrangement 56. Hence, the pattern according to which the radiation beam 22 emitted by the irradiation system 18 is incident on the sensor arrangement 26 is electronically tracked and "recorded".

Upon receipt of the signals output by the sensor arrangement 56, the control unit 50 generates a digital image of an actual irradiation pattern produced by the radiation beam 22 incident on the sensor arrangement 56 based on the signals output by the sensor arrangement 56. Thereafter, the control unit 50 compares the digital image of the actual radiation pattern with a digital image of a reference pattern which is stored in the memory 58 of the control unit 50. Based on the comparison between the digital image of the actual radiation pattern and the digital image of the reference pattern, the control unit 50 determines a deviation between the actual irradiation pattern and the reference pattern. In other words, based on the signals provided to the control unit 50 from the sensor arrangement 56, the control unit 50 directly generates a digital image of the "real" irradiation pattern and compares said digital image of the "real" irradiation pattern with a digital image of a reference pattern so as to determine a deviation between the actual irradiation pattern and the reference pattern.

Finally, the control unit 50 calibrates the irradiation system 18, in particular the scanner 34 of the irradiation system's 18 optical unit 28, based on the determined deviation between the actual irradiation pattern and the reference pattern. Specifically, the control unit 50 calibrates the irradiation system 18 based on the determined deviation between the actual irradiation pattern and the reference pattern in such a manner that the deviation between the actual irradiation pattern and the reference pattern is eliminated and consequently, the actual irradiation pattern is brought into alignment with the reference pattern.

The in the embodiment of a device 48 for calibrating an irradiation system 18 of an apparatus 10 for producing a three-dimensional work piece which is shown in FIG. 2, the sensor arrangement 56 is integrated into a calibration carrier 16 which, during normal operation of the apparatus 10, i.e. during operation of the apparatus 10 for generating the three-dimensional work piece, carries the raw material powder to be irradiated. Thus, in the embodiment of FIG. 2, the same carrier 16 is used for both the calibration process for calibrating the irradiation system 18 of the apparatus 10 and the normal operation of the apparatus 10.

Furthermore, in the device 48 depicted in FIG. 2, the sensor arrangement 56 comprises a plurality of sensors 56a which are arranged at discrete positions within the irradiation plane 52. The individual sensors 56a may be photo sensors, photo chips, photo diodes, CCD sensors and/or CMOS sensors. As becomes apparent, an individual sensor 56a is arranged in the irradiation plane 52 in the area of each point-shaped element of the calibration pattern. Thus, a combined detection area of the plurality of individual sensors 56a does not cover the entire area of the irradiation plane 52. However, a detection area of each of the sensors 56a is selected such that the sensors 56a are irradiated with the radiation beam 22 emitted by the irradiation system 18 according to the calibration pattern even if the irradiation system 18 is decalibrated. In other words, the detection area of each of the sensors 56a is large enough to ensure that the sensors 56a, during calibration of the irradiation system 18, are exposed to the radiation beam 22 emitted by the irradiation system 18, even if the actual irradiation pattern according to which the radiation beam 22, during calibration of the irradiation system 18, moves across the irradiation plane 52 is offset as compared to the reference pattern.

In addition to the alignment of the actual irradiation pattern according to which the radiation beam 22, during calibration of the irradiation system 18, moves across the irradiation plane 52 with the reference pattern, the calibration process performed under the control of the control unit 50 involves a calibration of the irradiation system 18 and in particular the scanner 34 of the irradiation system's 18 optical unit 28 so as to focus the radiation beam 22 emitted by the irradiation system 18 as desired. For focusing the radiation beam 22, the control unit 50 determines a width of a line of the actual irradiation pattern produced by the radiation beam 22 incident on the sensor arrangement 56, to compare the determined line width with a reference line width, and to calibrate the irradiation system 18 so as to focus the radiation beam 22 based on the comparison between the determined line width with the reference line. Specifically, the control unit 50 determines a deviation between the determined line width and the reference line width and calibrates the irradiation system 18 in such a manner that the deviation between the determined line width and the reference line width is eliminated. As a result a focusing of the radiation beam is achieved.

The device 48 depicted in FIG. 3 serves to calibrate an irradiation system 18 of an apparatus 10 for producing a three-dimensional work piece which comprises a plurality of irradiation units 18a, 18a. Each irradiation unit 18a, 18b is adapted to irradiate a radiation beam 22a, 22b onto an associated irradiation area 60, 62 of the irradiation plane 52 and onto an overlap area 64 arranged between the adjacent irradiation areas 60, 62. Thus, the overlap area 64 may be irradiated with radiation beams 22a, 22b emitted by either one of the irradiation units 18a, 18b.

For calibrating the irradiation system 18 comprising multiple irradiation units 18a, 18b, the control unit 50 of the device 48 controls the plurality of irradiation units 18a, 18b so as to irradiate the overlap area 64 with the radiation beams 22a, 22b emitted by the irradiation units 18a, 18b according to respective calibration patterns. The control unit 50 further generates a digital image of the actual irradiation patterns produced by the radiation beams 22a, 22b incident on the sensor arrangement 56 based on the signals output by the sensor arrangement 56. Additionally, the control unit 50 compares the digital image of the actual irradiation patterns with a digital image of respective reference patterns so as to determine a deviation between the actual irradiation patterns and the respective reference patterns. Finally, the control unit 50 calibrates the irradiation units 18a, 18b based on the determined deviation between the actual irradiation patterns and the reference patterns. Thus, the device 48 may be used to record the tracks of the plurality of radiation beams 22a, 22b incident on the overlap area 64 and to calibrate these tracks as desired. Consequently, the scanners 34 of the plurality of irradiation units 18a, 18b may be calibrated and adjusted relative to each other.

The device 48 shown in FIG. 3 further differs from the arrangement according to FIG. 2 in that the sensor arrangement 56 is equipped with a single sensor 56b having a detection area which is selected so as to substantially cover the irradiation plane 52. Like the individual sensors 56a of the sensor arrangement 56 according to FIG. 2, the single sensor 56b of the sensor arrangement 56 of FIG. 3 may be a photo sensor, a photo chip, a photo diode, a CCD sensor or a CMOS sensor. Further the sensor arrangement 56 is integrated into a calibration carrier 66 which is adapted to replace, during calibrating the irradiation system 18, the carrier 16 which, during normal operation of the apparatus 10, carries the raw material powder to be irradiated. Otherwise the function and the structure of the device 48 shown in FIG. 3 correspond to the function and the structure of the device 48 depicted in FIG. 2.

Optional features of the device 48 for calibrating an irradiation system 18 of an apparatus 10 for producing a three-dimensional work piece which herein have been described with reference to the specific embodiment of the device 48 according to FIG. 2 can be exchanged with features of the device 48 which herein have been described with reference to the specific embodiment of the device according to FIG. 3 as desired. For example, the device 48 depicted in FIG. 2 can be equipped with a sensor arrangement 56 comprising a single sensor 56b described herein in connection with the device 48 depicted in FIG. 2 or the sensor arrangement 56 of the device 48 depicted in FIG. 2 can be integrated into the carrier 16 which, during normal operation of the apparatus 10, carries the raw material powder to be irradiated and vice versa.

The invention claimed is:

1. An apparatus for producing a three-dimensional work piece, comprising:
    an irradiation system;
    a carrier which, during normal operation of the apparatus, carries a raw material powder to be irradiated; and
    a device for calibrating the irradiation system of the apparatus, the device comprising:
        a control unit adapted to control the irradiation system so as to irradiate a radiation beam onto an irradiation plane according to a calibration pattern, and
        a sensor arrangement adapted to be arranged in the irradiation plane and to output signals to the control unit in response to being irradiated with the radiation beam according to the calibration pattern,
    wherein the control unit further is adapted to:
        generate a digital image of an actual irradiation pattern produced by the radiation beam incident on the sensor arrangement based on the signals output by the sensor arrangement,
        compare the digital image of the actual irradiation pattern with a digital image of a reference pattern so as to determine a deviation between the actual irradiation pattern and the reference pattern, and
        calibrate the irradiation system based on the determined deviation between the actual irradiation pattern and the reference pattern,
    wherein the sensor arrangement is integrated into the carrier which, during normal operation of the apparatus, carries the raw material powder to be irradiated, or
    wherein the sensor arrangement is integrated into a calibration carrier which is adapted to replace, during calibrating the irradiation system, the carrier which, during normal operation of the apparatus, carries the raw material powder to be irradiated.

2. The apparatus according to claim 1,
    wherein the control unit is adapted to calibrate the irradiation system based on the determined deviation between the actual irradiation pattern and the reference pattern in such a manner that the deviation between the actual irradiation pattern and the reference pattern is eliminated.

3. The apparatus according to claim 2,
wherein the sensor arrangement comprises a plurality of sensors which are arranged at discrete positions within the irradiation plane, wherein a detection area of each of the sensors is selected such that the sensors are irradiated with the radiation beam emitted by the irradiation system according to the calibration pattern even if the irradiation system is decalibrated.

4. The apparatus according to claim 2,
wherein the sensor arrangement comprises a single sensor, wherein a detection area of the single sensor is selected so as to substantially cover the irradiation plane.

5. The apparatus according to claim 4,
wherein the digital image of the reference pattern is stored in a memory of the control unit, and/or wherein the control unit is adapted to display the digital image of the reference pattern and/or the digital image of the actual irradiation pattern on a display device, and/or wherein the control unit is adapted to control the irradiation system in such a manner that a power of the radiation beam, during calibrating the irradiation system, is lower than during normal operation of the apparatus.

6. The apparatus according to claim 5,
wherein the control unit is adapted to:
determine a width of a line of the actual irradiation pattern produced by the radiation beam incident on the sensor arrangement,
compare the determined line width with a reference line width, and
calibrate the irradiation system so as to focus the radiation beam based on the comparison between the determined line width and the reference line width.

7. The apparatus according to claim 6,
wherein the control unit is adapted to:
determine a shape of a spot of the radiation beam incident on the sensor arrangement,
compare the determined shape with a reference shape, and
calibrate the irradiation system so as compensate for an elliptic distortion of the radiation beam based on the comparison between the determined shape and the reference shape.

8. The apparatus according to claim 1,
wherein the sensor arrangement comprises a plurality of sensors which are arranged at discrete positions within the irradiation plane, wherein a detection area of each of the sensors is selected such that the sensors are irradiated with the radiation beam emitted by the irradiation system according to the calibration pattern even if the irradiation system is decalibrated.

9. The apparatus according to claim 1,
wherein the sensor arrangement comprises a single sensor, wherein a detection area of the single sensor is selected so as to substantially cover the irradiation plane.

10. The apparatus according to claim 1,
wherein the digital image of the reference pattern is stored in a memory of the control unit, and/or wherein the control unit is adapted to display the digital image of the reference pattern and/or the digital image of the actual irradiation pattern on a display device, and/or wherein the control unit is adapted to control the irradiation system in such a manner that a power of the radiation beam, during calibrating the irradiation system, is lower than during normal operation of the apparatus.

11. The apparatus according to claim 1,
wherein the control unit is adapted to:
determine a width of a line of the actual irradiation pattern produced by the radiation beam incident on the sensor arrangement,
compare the determined line width with a reference line width, and
calibrate the irradiation system so as to focus the radiation beam based on the comparison between the determined line width and the reference line width.

12. The apparatus according to claim 1,
wherein the control unit is adapted to:
determine a shape of a spot of the radiation beam incident on the sensor arrangement,
compare the determined shape with a reference shape, and
calibrate the irradiation system so as compensate for an elliptic distortion of the radiation beam based on the comparison between the determined shape and the reference shape.

13. The apparatus according to claim 1,
wherein the irradiation system of the apparatus for producing a three-dimensional work piece comprises a plurality of irradiation units, each irradiation unit being adapted to irradiate a radiation beam onto an associated irradiation area of the irradiation plane and onto an overlap area arranged between adjacent irradiation areas, and wherein the control unit is adapted to:
control the plurality of irradiation units so as to irradiate a selected overlap area with a plurality of radiation beams according to respective calibration patterns,
generate a digital image of the actual irradiation patterns produced by the radiation beams incident on the sensor arrangement based on the signals output by the sensor arrangement,
compare the digital image of the actual irradiation patterns with a digital image of respective reference patterns so as to determine a deviation between the actual irradiation patterns and the respective reference patterns, and
calibrate the irradiation units based on the determined deviation between the actual irradiation patterns and the reference patterns.

14. A method for calibrating an irradiation system of an apparatus for producing a three-dimensional work piece, the method comprising the steps of:
controlling the irradiation system so as to irradiate a radiation beam onto an irradiation plane according to a calibration pattern, and
arranging a sensor arrangement in the irradiation plane which outputs signals in response to being irradiated with the radiation beam according to the calibration pattern,
generating a digital image of an actual irradiation pattern produced by the radiation beam incident on the sensor arrangement based on the signals output by the sensor arrangement,
comparing the digital image of the actual irradiation pattern with a digital image of a reference pattern so as to determine a deviation between the actual irradiation pattern and the reference pattern, calibrating the irradiation system based on the determined deviation between the actual irradiation pattern and the reference pattern, and wherein the sensor arrangement is integrated into a carrier of the apparatus which, during normal operation of the apparatus, carries a raw material powder to be irradiated, or wherein the sensor arrangement is integrated into a calibration carrier which is adapted to replace, during calibrating the irradiation system, a carrier of the apparatus which, during normal operation of the apparatus, carries a raw material powder to be irradiated.

15. The method according to claim 14, wherein the irradiation system is calibrated based on the determined deviation between the actual irradiation pattern and the reference pattern in such a manner that the deviation between the actual irradiation pattern and the reference pattern is eliminated.

16. The method according to claim 14, wherein the sensor arrangement comprises a plurality of sensors which are arranged at discrete positions within the irradiation plane, wherein a detection area of each of the sensors is selected such that the sensors are irradiated with the radiation beam emitted by the irradiation system according to the calibration pattern even if the irradiation system is decalibrated, or wherein the sensor arrangement comprises a single sensor which is arranged in the irradiation plane, wherein a detection area of the single sensor is selected so as to substantially cover the irradiation plane.

17. The method according to claim 14, wherein the digital image of the reference pattern is stored in a memory of the control unit, and/or wherein the digital image of the reference pattern and/or the digital image of the actual irradiation pattern is displayed on a display device, and/or wherein the irradiation system is controlled in such a manner that a power of the radiation beam, during calibrating the irradiation system, is lower than during normal operation of the apparatus.

18. The method according to claim 14, further comprising:

determining a width of a line of the actual irradiation pattern produced by the radiation beam incident on the sensor arrangement, comparing the determined line width with a reference line width, and calibrating the irradiation system so as to focus the radiation beam based on the comparison between the determined line width and the reference line width.

19. The method according to claim 14, further comprising:

determining a shape of a spot of the radiation beam incident on the sensor arrangement, comparing the determined shape with a reference shape, and calibrating the irradiation system so as compensate for an elliptic distortion of the radiation beam based on the comparison between the determined shape and the reference shape.

20. The method according to claim 14, wherein the irradiation system of the apparatus for producing a three-dimensional work piece comprises a plurality of irradiation units, each irradiation unit being adapted to irradiate a radiation beam onto an associated irradiation area of the irradiation plane and onto an overlap area arranged between adjacent irradiation areas, and wherein the method comprises the steps of:

controlling the plurality of irradiation units so as to irradiate a selected overlap area with a plurality of radiation beams according to respective calibration patterns, generating a digital image of actual irradiation patterns produced by the radiation beams incident on the sensor arrangement based on the signals output by the sensor arrangement, comparing the digital image of the actual irradiation patterns with a digital image of respective reference patterns so as to determine a deviation between the actual irradiation patterns and the respective reference patterns, and calibrating the irradiation units based on the determined deviation between the actual irradiation patterns and the reference patterns.

* * * * *